United States Patent [19]

Gulliksen

[11] 4,257,086
[45] Mar. 17, 1981

[54] METHOD AND APPARATUS FOR CONTROLLING RADIANT ENERGY

[75] Inventor: John E. Gulliksen, Shrewsbury, Mass.

[73] Assignee: Koehler Manufacturing Company, Marlborough, Mass.

[21] Appl. No.: 87,428

[22] Filed: Oct. 22, 1979

[51] Int. Cl.³ .................. G03B 27/76; F21Y 13/04; G03B 9/02
[52] U.S. Cl. ................... 362/279; 354/271; 355/71
[58] Field of Search ........... 362/256, 279, 300, 307, 362/293; 354/274; 355/67, 71

[56] References Cited

U.S. PATENT DOCUMENTS

| 2,439,330 | 4/1948 | Zander | 354/274 X |
| 2,471,172 | 5/1949 | Stoller | 354/274 X |
| 3,150,559 | 9/1964 | Baasner et al. | 362/279 X |
| 3,362,313 | 1/1968 | Wollensak et al. | 354/274 |
| 3,689,760 | 9/1972 | Stewart | 355/67 X |
| 4,018,527 | 4/1977 | Bartel et al. | 355/71 |

Primary Examiner—Donald A. Griffin
Attorney, Agent, or Firm—Hamilton, Brook, Smith & Reynolds

[57] ABSTRACT

Radiant energy from a luminaire body is selectively controlled by means of a diaphragm structure mounted at one side of the luminaire body. The diaphragm structure includes a plurality of radiant energy transmitting leaves, means for pivotally supporting the leaves on a housing component of the luminaire body, and cylindrical adjustment means for moving the leaves through limited arcs of travel into and out of the paths of travel of constituent rays of energy emitted from the luminaire body. The diaphragm leaves may comprise filtering elements as well as refracting bodies. By such means the characteristics, for example color, distribution etc., of the emitted radiant energy, partially or in its entirety, may be varied.

13 Claims, 21 Drawing Figures

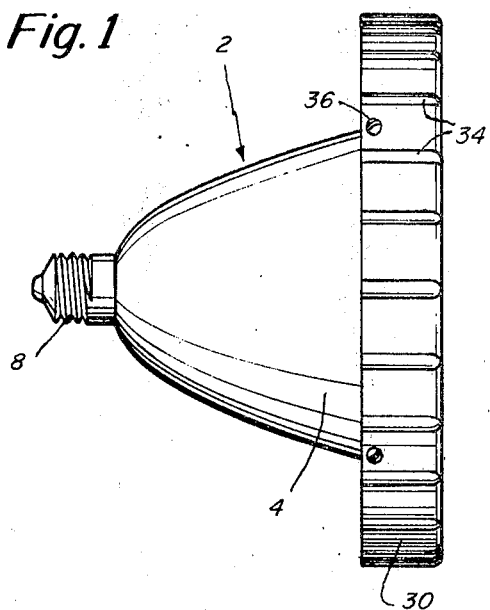
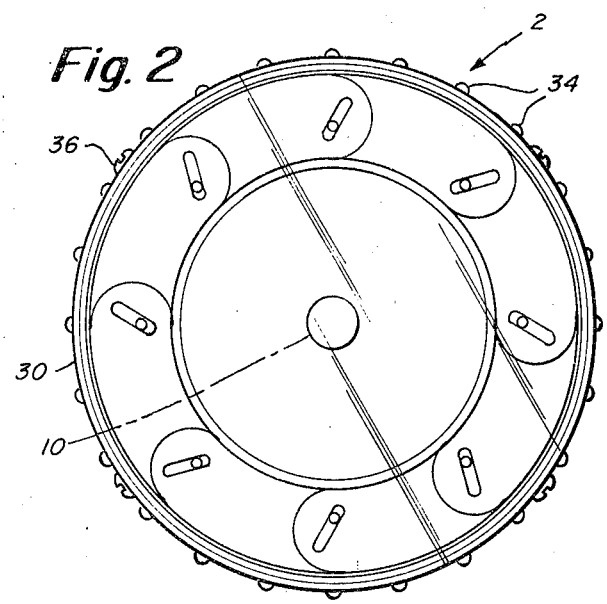
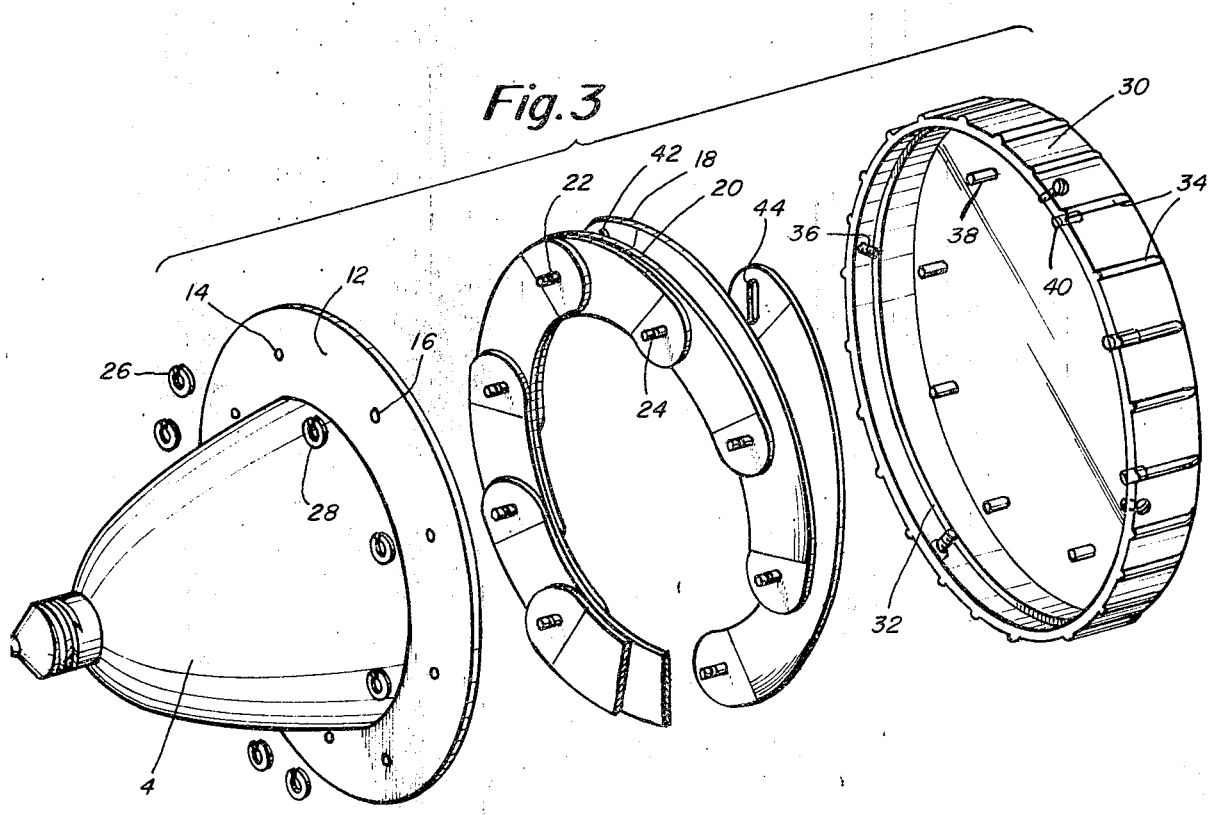

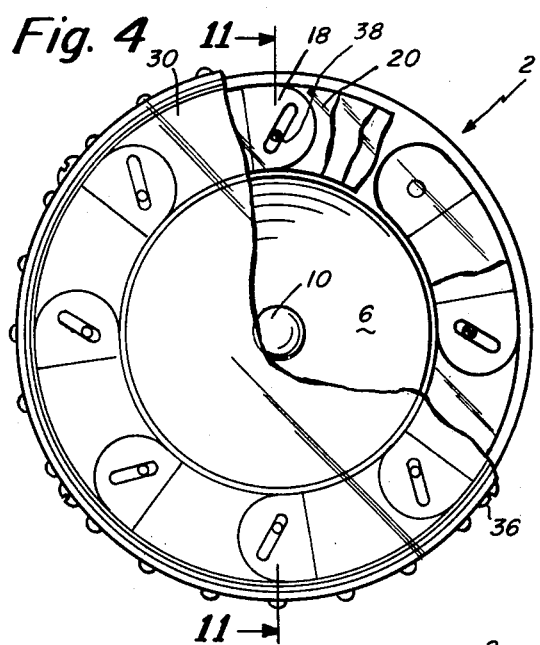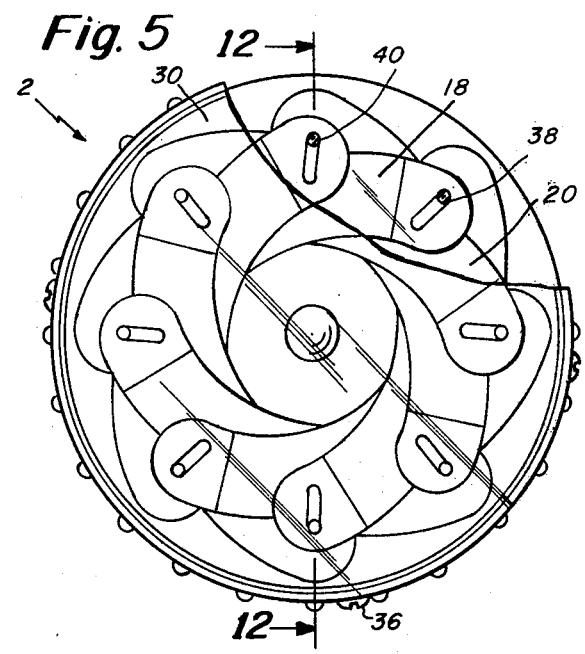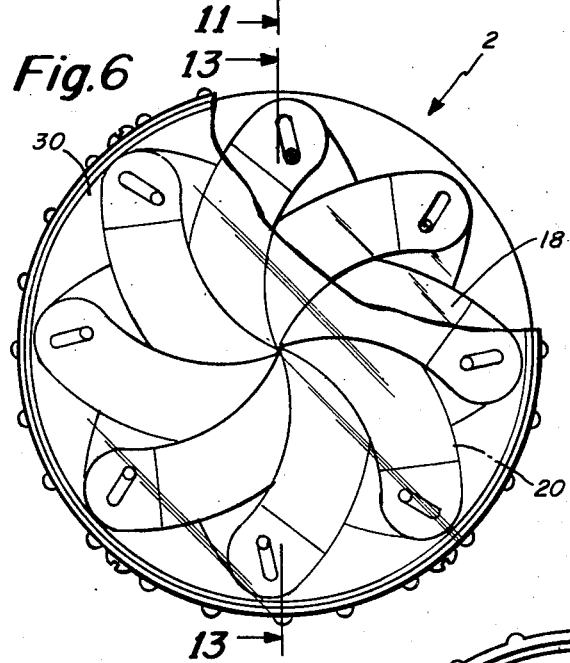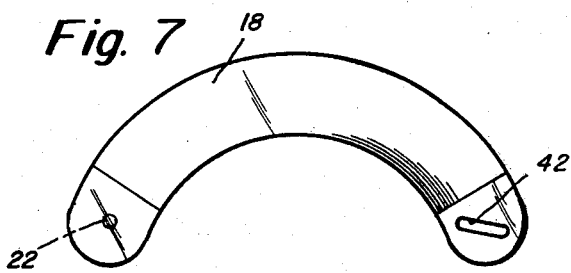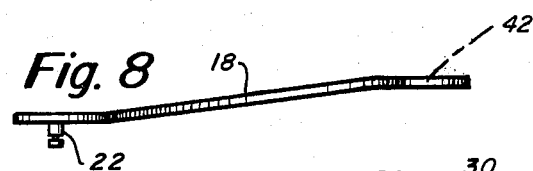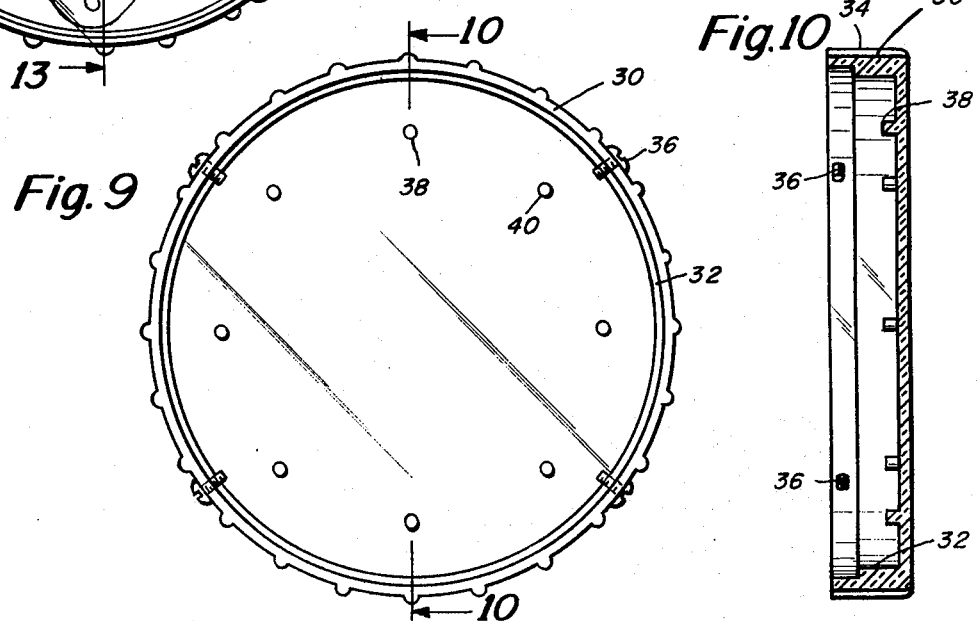

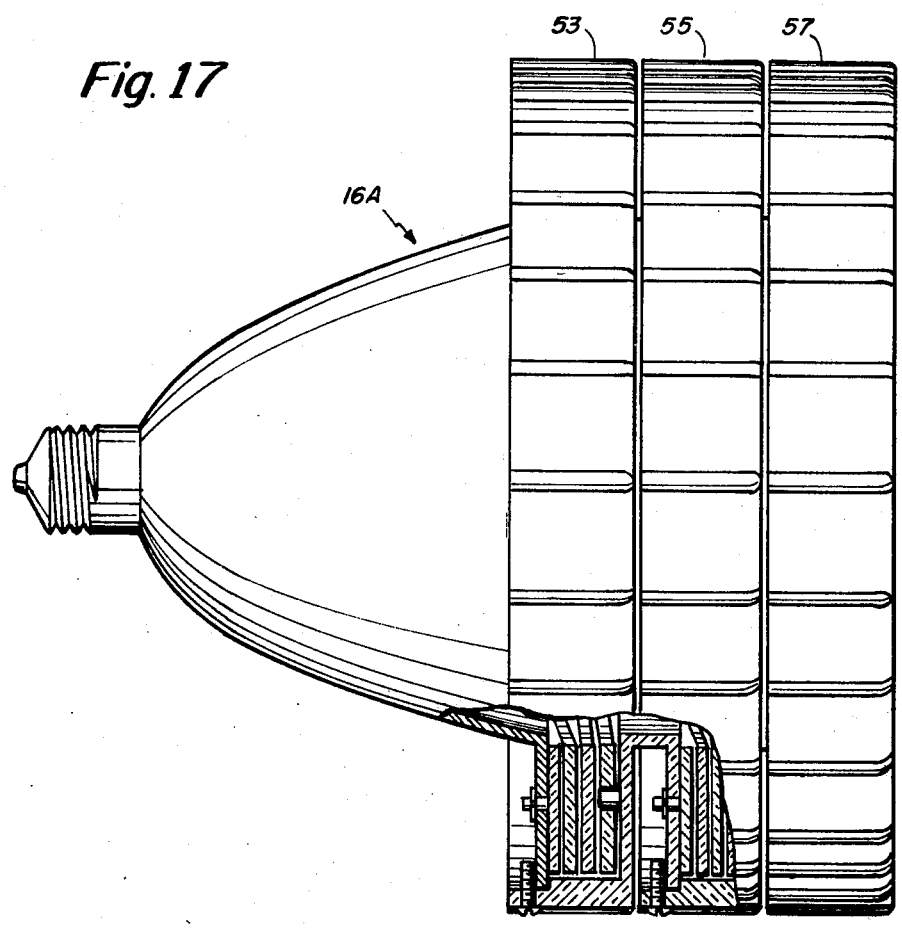

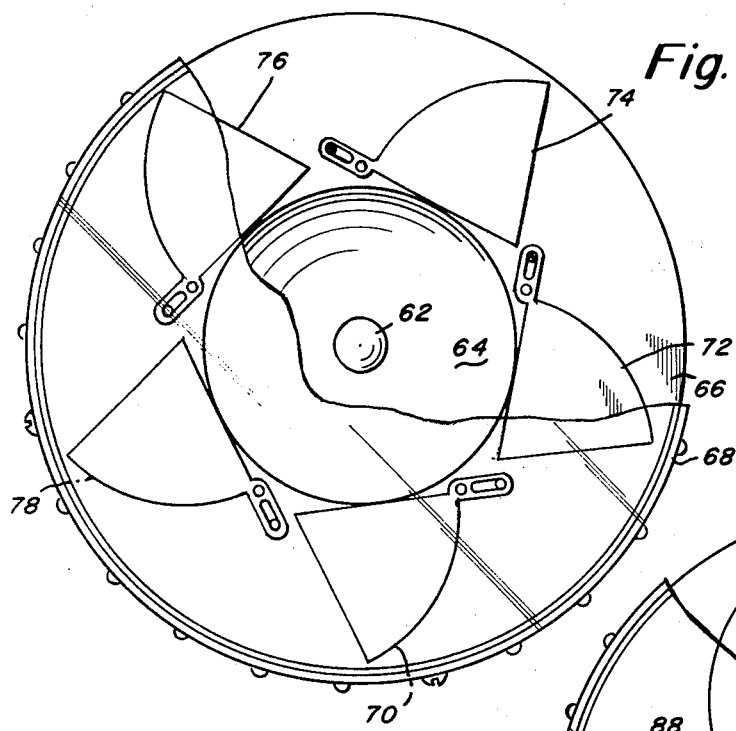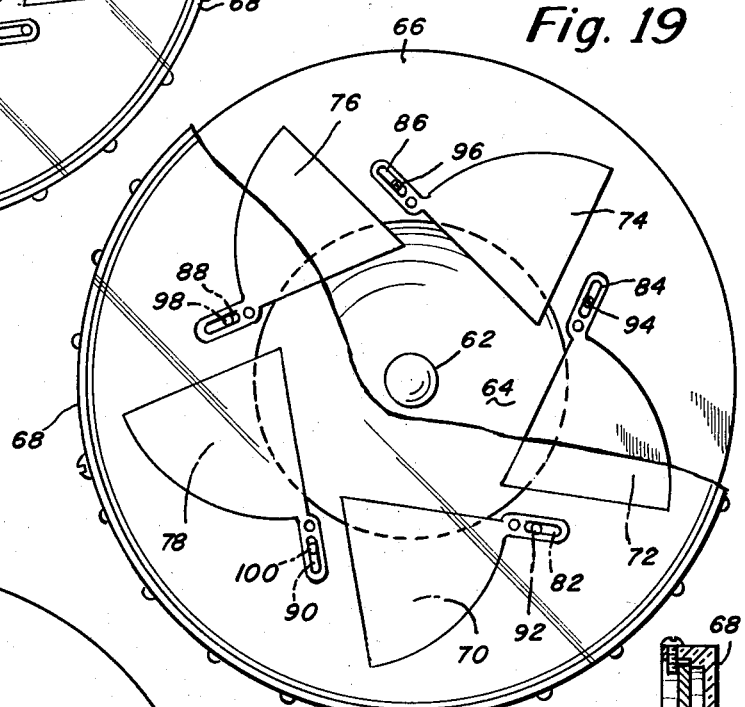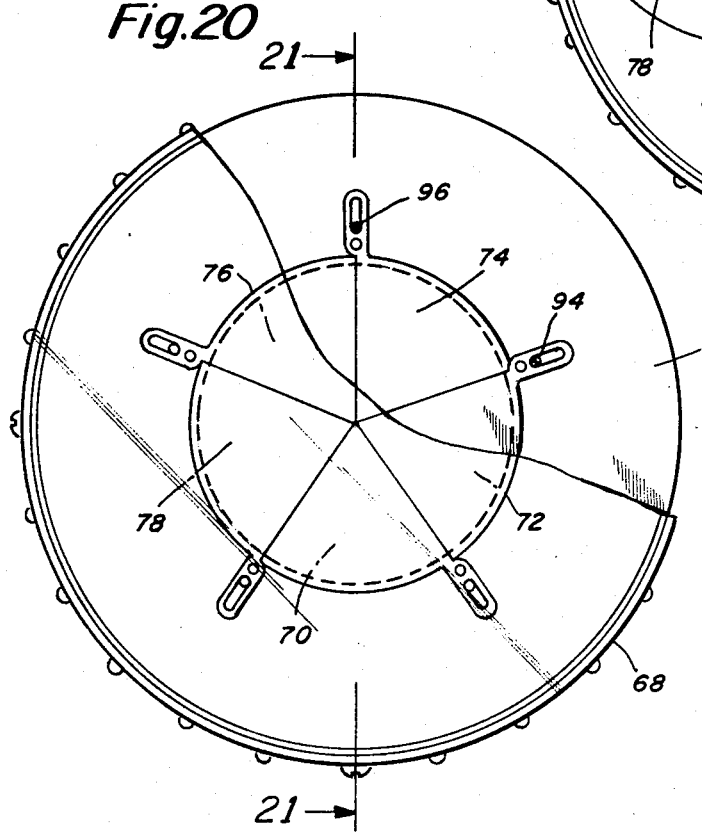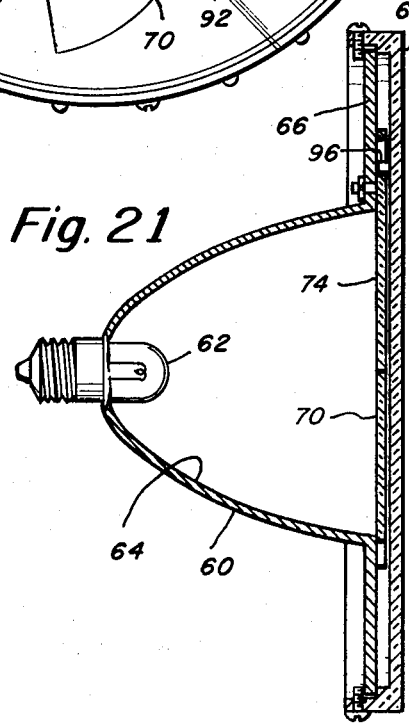

METHOD AND APPARATUS FOR CONTROLLING RADIANT ENERGY

BACKGROUND OF THE INVENTION

Various forms of apparatus have been proposed in the luminaire art to achieve control of radiant energy. One form comprises a rotatable structure having multiple filters for producing changes in color. This rotatable structure is commonly referred to in the art as a "color wheel". Another form of apparatus consists of a housing having a reflector body and an energy source movable with respect to one another. This apparatus may be utilized to produce either a spot distribution or a defocused annular distribution of emitted radiant energy.

Still another well known form of apparatus of the class noted consists of an opaque iris-type device which is used to vary the size of an aperture through which radiant energy may be omitted from a luminaire body.

All of these prior art systems are subject to certain disadvantages. The "color wheel," for example, does not readily allow changes in color to take place progressively from the edges of a light pattern towards its center which is extremely desirable for highlighting subject matter. Where an energy source and a deflector body, movable with respect to one another, are employed it is not possible to produce an even flood distribution. Use of an opaque iris-type diaphragm is extremely inefficient when utilized to produce a spot configuration since a large percentage of available radiant energy will be excluded by the opaque iris.

SUMMARY OF THE INVENTION

The present invention is concerned with improved methods and apparatus for controlling radiant energy and an object of the invention is to provide improved diaphragm structures which can readily be combined with luminaire bodies of various classes to control radiant energy emitted from such luminaire bodies.

Another object of the invention is to devise a diaphragm structure in which a plurality of radiant energy transmitting elements or leaves are arranged to be adjustably supported on a luminaire body in a manner such that the leaves are movable into and out of the path of travel of radiant energy emitted from a luminaire body.

Still another object of the invention is to provide an arrangement of diaphragm leaves which may be employed for refracting as well as filtering emitted radiant energy. Such an arrangement may be adjusted in a convenient and rapid manner to control the characteristics, for example color, distribution etc., of emitted radiant energy while preserving the efficiency of the luminaire body.

BRIEF DESCRIPTION OF THE DRAWINGS

FIG. 1 is a side elevational view of a luminaire apparatus in which is provided one desirable form of diaphragm structure for controlling radiant energy emitted from the luminaire apparatus in accordance with the invention.

FIG. 2 is a front elevational view of the apparatus of FIG. 1.

FIG. 3 is an exploded view of the apparatus illustrated in FIG. 1 showing in perspective a luminaire housing and components of the diaphragm structure of FIG. 1.

FIG. 4 is a front elevational view of the diaphragm structure with portions of cylindrical adjustment component partly broken away to more clearly show the diaphragm leaves in a fully opened position so that no emitted radiant energy is modified.

FIG. 5 is a view similar to FIG. 4, but illustrating diaphragm leaves in a partly closed position to provide for modifying a portion of the emitted radiant energy.

FIG. 6 is a view similar to FIGS. 4 and 5 but illustrating the diaphragm leaves in a fully closed position to modify substantially all emitted radiant energy.

FIG. 7 is a detail plan view of one of the diaphragm leaves.

FIG. 8 is a detail side view of the component of FIG. 7.

FIG. 9 is a detail view of a cylindrical adjustment component of the diaphragm structure.

FIG. 10 is a cross section taken on the line 10—10 of FIG. 9.

FIG. 17 is a diagrammatic view illustrating a housing body having a plurality of diaphragm structures mounted thereon.

FIGS. 18–21 illustrate another desirable form of diaphragm structure of the invention mounted on a luminaire body.

DETAILED DESCRIPTION OF THE INVENTION

Figure 11:
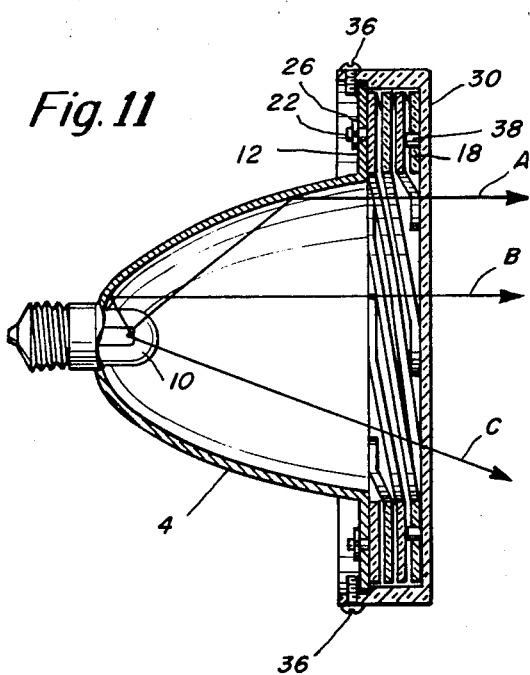
FIG. 11 is a cross sectional view taken on the line 11—11 of FIG. 4 illustrating diagrammatically paths of travel of emitted radiant energy.

Referring in more detail to the drawings, FIG. 1 illustrates a luminaire apparatus generally denoted by the arrow 2 and which includes a luminaire housing 4 and a composite diagram structure of the invention mounted thereon.

The housing 4 may be of a shape as indicated in FIGS. 1-3 inclusive and may have a reflecting surface 6 more clearly shown in FIG. 4. This reflecting surface 6 is of paraboloidal form and is intended to be illustrative of other desirable configurations, e.g. ellipsoidal and the like, and where the reflecting surface may be integral with or separately formed from the housing 4.

It will also be noted that the housing 4 is provided with a screw type base for engagement in a conventional electrical socket by means of which a bulb member 10 may be energized to provide a source of radiant energy. However, other well known means for energizing the bulb member 10 may be employed and various sources of radiant energy may be utilized such as an incandescent lamp, a carbon arc lamp and the like.

In accordance with the invention, the composite diaphragm structure is secured around an outer peripheral portion of the housing 4. Principal parts of this composite diaphragm structure include a mounting base supported in fixed relation to the housing 4, a plurality of diaphragm leaves pivotally attached to the mounting base and a cylindrical adjustment member arranged to enclose the diaphragm leaves and mounting base and having means for engaging each of the diaphragm leaves and pivoting them through limited arcs of travel.

Numeral 12 denotes the mounting base which may be formed as an annular flange portion of the housing 4. If desired, the base 12 may be separately formed and attached to housing 4 by circumferentially disposed fastening means. Located through the base member 12, in circumferentially spaced relation to the outer peripheral edge of the base, are openings as 14 and 16 which are utilized to attach diaphragm leaves to the base as hereinafter described.

The diaphragm leaves are denoted by numerals as 18 and 20 and are more clearly shown in FIGS. 2-8 inclusive. Each of the leaves as 18 and 20 are formed of a radiant energy transmitting material such as glass, plastic substances (e.g. a polycarbonate resin, an acrylic resin or the like) and are constructed of an arcuate shape as shown in detail, for example, in FIG. 7, and opposite ends of each of the leaves are offset with respect to one another as shown in FIG. 8. A typical leaf thickness may be 0.1 inch. Each of the leaves further includes attaching pins as 22 and 24 (FIGS. 3 and 8) of a shape suitable for engaging respective openings as 14 and 16 in the mounting base 12. The pins when thus engaged may be secured in place by suitable fastening means such as, for example, snap rings as 26 and 28 shown in FIG. 3. The length and number of leaves are chosen with reference to the maximum desired diameter of the luminaire body. For example, with a luminaire diameter of 3¼ inches having a reflecting surface of a 2 inch diameter there may be employed eight arcuate leaves each having a width of 3/16 inches with an inner radius of 1 1/16 inches and an outer radius of 1⅜ inches and ends of each leaf may have angular extension of 135°.

Numeral 30 denotes the cylindrical adjustment component of the diaphragm structure of the invention. This adjustment component 30 is rotatably mounted around the diaphragm leaves and mounting base as shown in FIG. 11. In FIG. 3 the construction of adjustment member 30 is indicated in more detail and as shown therein includes an annular shoulder 32 which may be either continuous or interrupted in shape and which is designed to slidably engage the base member 12 in a position of abutment as suggested in FIG. 11. Radially disposed through adjustment member 30 are a plurality of retaining elements as 36 which extend inwardly to engage against the rear surface of the base 12 and hold the adjustment member in place. Fixed in an inner side of the adjustment member 30, as shown in FIG. 3, are a plurality of spaced apart pins as 38 and 40 located along a circumferential line in a position to slidably engage in respective elongated slots as 42 and 44 formed in the diaphragm leaves. One such slot denoted by numeral 42 is further shown in detail in FIGS. 7 and 8.

In one desirable form the adjustment member 30 may be made of a transparent material such as glass, a polycarbonate, an acrylic or the like and completely overlie the front of the housing 4. However, member 30 may also be made with an opening formed therein to allow unobstructed passage of radiant energy. In such case outer portions of the adjustment member may be made of an opaque material.

In assembling the diaphragm components the arcuate leaves as 18 and 20 are first positioned against the housing base 12 and pins 22 and 24 are engaged through the openings as 14 and 16 and fastened by snap rings as 26 and 28. The leaves when thus pivotally mounted on the base 12 may be swung into positions such that inner and outer arcuate edges are substantially confined in an annular space defined by the inner periphery of the annular shoulder 32 of the adjustment member 30 and the outer peripheral edge of the reflecting surface 6. FIGS. 4 and 5 show the leaves in this relatively annular disposed position of adjustment with the engaging pins as 38 and 40 received in respective elongated slots of the leaves. When thus secured by pins as described the leaves, due to their offset formation, assume positions as illustrated in FIG. 11 and occur in closely spaced apart relationship.

In the relatively annularly disposed open position of adjustment described above radiant energy emitted from the source 10 is unobstructed and passes outwardly in the manner indicated diagrammatically by arrows A, B and C in FIG. 11.

Figure 12:
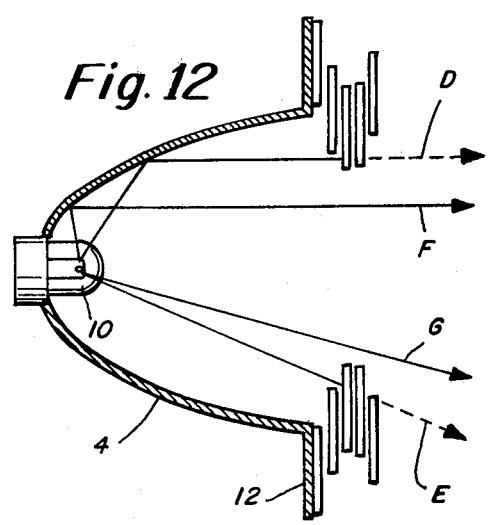
FIG. 12 is a cross sectional view taken on the line 12—12 of FIG. 5 and also illustrating paths of travel of emitted radiant energy.

In FIG. 5 the diaphragm leaves are shown swung partly inwardly into positions resulting from rotative movement of the adjustment member 30. When the leaves are thus adjusted a portion of radiant energy emitted from source 10 is intercepted by some portions of the diaphragm. Referring to FIG. 12, reflected radiant energy thus intercepted is indicated by the arrow D; directly emitted radiant energy thus intercepted is indicated by arrow E. Radiant energy not intercepted is indicated by arrows F and G.

Figure 13:
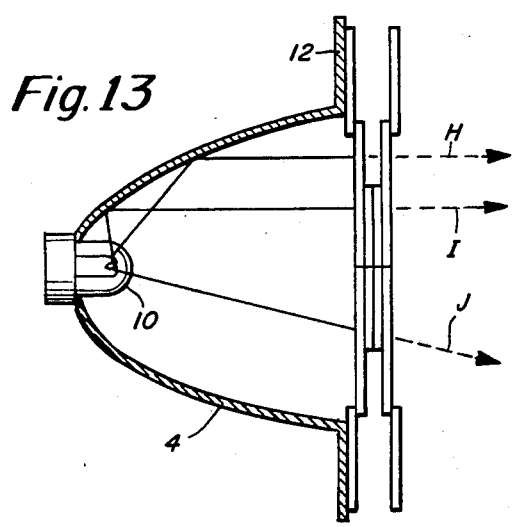
FIG. 13 is a cross sectional view in schematic form taken on the line 13—13 of FIG. 6 and illustrating other paths of travel.

In FIG. 6 further rotation of the adjustment member is illustrated with the diaphragm leaves completely closed and in this position all radiant energy, either direct or reflected, is intercepted by the leaves as suggested by the arrows H, I and J in FIG. 13.

In FIGS. 12 and 13 the diaphragm leaves comprise filtering bodies and therefore characteristics such as color may be modified while leaving distribution unchanged as is suggested by the dotted portion of the arrows noted.

Figure 14:
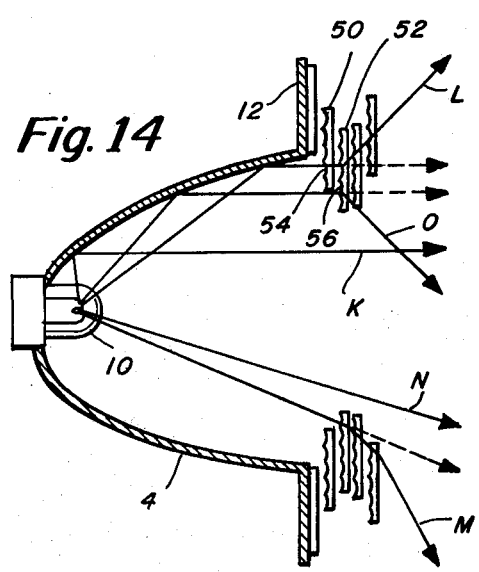
FIG. 14 is a diagrammatic view similar to FIG. 12, but showing diaphragm leaves consisting of refracting bodies arranged to provide a partial flood configuration and further illustrating paths of travel of emitted radiant energy.
Figure 15:
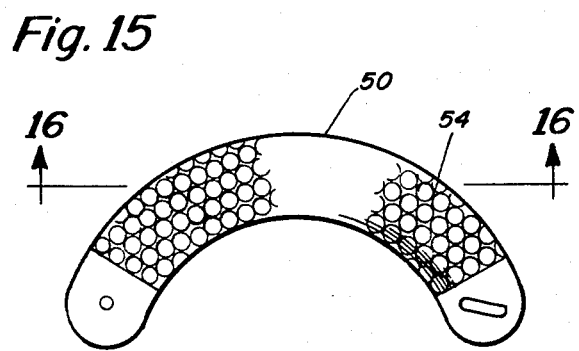
FIG. 15 is a detail front elevational view of one of the diaphragm leaves similar to that shown in FIG. 7, but formed with refracting portions.
Figure 16:
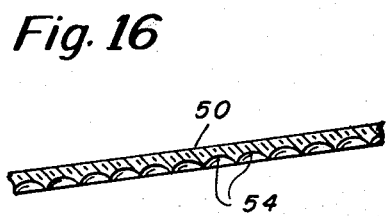
FIG. 16 is a cross sectional view taken on the line 16—16 of FIG. 15.

In FIG. 14 there is illustrated a luminaire body of the invention having a modified form of diaphragm leaves as 50 and 52 which are formed with concaved refracting portions as 54 and 56. These refracting portions provide for a modification of distribution of radiant energy emitted from the luminaire body. As shown in FIG. 14 unrefracted radiant energy is illustrated by arrows K and N while modified or refracted radiant energy is illustrated by arrows l, M and O. Such refraction will progressively approach flood configuration as the leaves are progressively closed. Details of these refracting leaves are shown in FIGS. 15 and 16.

By means of the diaphragm structure now disclosed it will be apparent that emitted radiant energy in part or in its entirety may be modified in various ways by utilizing filter means, polarizing means, coloring means, refracting means, or any combination thereof to alter characteristics of the emitted radiant energy.

It may be desired to selectively control more than one characteristic of emitted radiant energy. This may be accomplished for example by providing a luminaire body 16A with a plurality of diaphragm structures as 53, 55, and 57.

It may also be desired to modify the diaphragm construction. In FIGS. 18–21 there is illustrated one desirable modification. As shown therein numeral 60 (FIG. 21) denotes a housing of the class earlier described and having a bulb 62 and a reflector surface 64. A mounting base 66 is secured to the housing 60 and has diaphragm leaves 70, 72, 74, 76 and 78 attached thereto in the manner previously disclosed. These leaves are enclosed within an adjustment member 68 which is rotatably mounted around the base 60 and which is held in place in the manner previously disclosed. The leaves noted are formed with projecting lug portions in which are provided elongated slots as 82, 84, 86, 88 and 90.

Rotation of the adjustment member 68 operates to open and close the leaves to control emitted radiant energy in the manner earlier described. The modification of diaphragm structure of FIGS. 18–21, it should be observed, differs from the diaphragm arrangement of FIGS. 1–10 in that the leaves of FIGS. 1–10 move in different planes of rotation, while the leaves of FIGS. 18–21 move in a common plane. This may be advantageous in some cases.

I claim:

1. A luminaire apparatus comprising a housing, a source of radiant energy located in the housing, a diaphragm structure mounted on the housing and consisting of radiation transmitting elements which include refracting components and means for rotatably adjusting the diaphragm structure and varying distribution of radiant energy projected from the housing between spot and flood configuration.

2. The invention of claim 1 in which the housing includes a reflecting surface located around the source of radiation.

3. The invention of claim 1 in which the housing includes a reflecting surface substantially paraboloidal in shape.

4. The invention of claim 1 in which the housing includes a separately formed reflector member.

5. The invention of claim 1 in which the housing includes a feflecting surface of substantially ellipsoidal shape.

6. A luminaire apparatus comprising a housing, a source of radiant energy located in the housing, a diaphragm structure mounted on the housing, and consisting of radiation transmitting elements and means for rotatably adjusting the diaphragm structure to control radiant energy emitted from the housing, said housing being formed with an annular flange which extends radially outward at right angles to the central axis of the housing, and the radiation transmitting elements being pivotally attached to the flange means.

7. The invention of claim 6 in which the radiation transmitting elements of the diaphragm structure consist of leaves of arcuate shape which are formed with elongated slots at respective extremities thereof.

8. The invention of claim 7 in which the means for rotatably adjusting the diaphragm structure comprises a cylindrical member rotatably mounted around the annular flange and having pin means engaged in respective slots of the said diaphragm leaves.

9. The invention of claim 8 in which opposite ends of each of the diaphragm leaves are offset with respect to one another and the diaphragm leaves are located within the cylindrical adjustment member in spaced apart relation to one another.

10. The invention of claim 9 in which the cylindrical member is formed with an annular shoulder which extends radially inwardly to engage against an inner surface of the housing flange.

11. Apparatus for controlling radiant energy from a luminaire body, said apparatus comprising a base means for use with said luminaire body, a plurality of radiant energy transmitting elements arranged in pivoted relationship on the base means, adjustment means rotatably mounted on the base means engaged with the radiant energy transmitting elements, said adjustment means being operative to move portions of the radiant energy transmitting elements into and out of the path of radiant energy emitted by the luminaire body to progressively control selected characteristics of the emitted radiant energy, said luminaire body being formed with a reflecting surface having an outer peripheral edge of circular shape and the base means being mounted around the outer peripheral edge to constitute an annular flange portion which extends radially outward at right angles to the central axis of the luminaire body.

12. In a method of controlling distribution of radiant energy from a luminaire body in which a source of radiant energy is supported in the luminaire body, the steps which include moving a plurality of pivoted refracting elements into and out of the path of travel of radiant energy emitted by the luminaire body varying the distribution of the emitted radiant energy between spot and flood configuration.

13. Apparatus for controlling radiant energy from a luminaire body, said apparatus comprising a base means for use with said luminaire body, a plurality of radiant energy transmitting elements arranged in pivoted relationship on the base menas, adjustment means rotatably mounted on the base means engaged with the radiant energy transmitting elements, said adjustment means being operative to move portions of the radiant energy transmitting elements into and out of the path of radiant energy emitted by the luminaire body to progressively control selected characteristics of the emitted radiant energy, said luminaire body being formed with a reflecting surface having an outer peripheral edge of circular shape and the base means being mounted around the outer peripheral edge to constitute an annular flange portion which extends radially outward at right angles to the central axis of the luminaire body, said annular flange being formed with openings occurring in circumferentially spaced apart relation to one another, and the said radiation transmitting elements being provided with attaching pin means engageable in the said openings, and said radiation transmitting elements being further formed with elongated slots, and said adjustment means being provided with attaching pin means engageable in respective elongated slots and operative to move the radiation transmitting elements through limited arcs of travel.

* * * * *